United States Patent
Fan (10) Patent No.: US 9,298,066 B1
(45) Date of Patent: Mar. 29, 2016

(54) MULTI-FUNCTIONAL SUPPORT ASSEMBLY

(71) Applicant: Eagle Fan, Che-Pei (TW)

(72) Inventor: Eagle Fan, Che-Pei (TW)

( * ) Notice: Subject to any disclaimer, the term of this patent is extended or adjusted under 35 U.S.C. 154(b) by 0 days.

(21) Appl. No.: 14/525,954

(22) Filed: Oct. 28, 2014

(51) Int. Cl.
| | |
|---|---|
| *F16M 11/38* | (2006.01) |
| *G03B 17/56* | (2006.01) |
| *F16M 11/24* | (2006.01) |
| *F16M 11/28* | (2006.01) |
| *F16M 13/04* | (2006.01) |
| *F16M 13/06* | (2006.01) |
| *F16M 11/32* | (2006.01) |

(52) U.S. Cl.
CPC ........... *G03B 17/561* (2013.01); *F16M 11/242* (2013.01); *F16M 11/28* (2013.01); *F16M 13/04* (2013.01); *F16M 13/06* (2013.01); *F16M 11/32* (2013.01); *F16M 11/38* (2013.01)

(58) Field of Classification Search
USPC .......... 248/177.1, 178.1, 180.1, 185.1, 187.1, 248/166, 165, 168, 169, 170, 171; 359/811, 359/812, 813
See application file for complete search history.

(56) References Cited

U.S. PATENT DOCUMENTS

| | | | | |
|---|---|---|---|---|
| 6,265,969 | B1 * | 7/2001 | Shih | 340/468 |
| 6,899,441 | B2 * | 5/2005 | Chen | 362/102 |
| 9,017,181 | B2 * | 4/2015 | Evans | 473/176 |
| 2004/0155159 | A1 * | 8/2004 | Tiffen et al. | 248/177.1 |
| 2005/0092878 | A1 * | 5/2005 | Murray et al. | 248/171 |
| 2006/0175483 | A1 * | 8/2006 | Osaka | 248/177.1 |
| 2007/0246619 | A1 * | 10/2007 | Chih | 248/166 |
| 2011/0122605 | A1 * | 5/2011 | Deighton et al. | 362/183 |
| 2011/0157882 | A1 * | 6/2011 | Wessel | 362/205 |

* cited by examiner

*Primary Examiner* — Alfred J Wujciak
(74) *Attorney, Agent, or Firm* — Rabin & Berdo, P.C.

(57) ABSTRACT

A multi-functional support assembly is provided, including a fixed base, a locking element, a support element and a plurality of leg elements. The support element penetrates through the fixed base and can slide linearly inside the fixed base for position adjustment. The locking element is disposed at the fixed base. In a locked state, the locking element can fasten the position of the support element with respect to the fixed base. The plurality of leg elements is coupled to the circumference of the fixed base, with each leg element having a side wall on both sides. When folded, the side walls of two adjacent leg elements are aligned side-by-side closely so that the leg elements form a hollow tube easy to hold. When expanded, the leg elements are rotated outwards around the coupling to form the legs of the support assembly in a standing position.

7 Claims, 9 Drawing Sheets

MULTI-FUNCTIONAL SUPPORT ASSEMBLY

TECHNICAL FIELD

The technical field generally relates to a multi-functional support assembly, and more particularly to a support assembly able to be folded into a tubular shape for easy holding in hand and becoming a standing tripod to provide support when expanded.

BACKGROUND

As the smart phone becomes ubiquitous for photography use, selfie becomes one of the most popular modes for taking pictures. For a selfie photo, a user must hold the smart phone in a stretch-out hand. However, as arm-length distance is often insufficient for taking selfie, a retractable extension auxiliary device is developed to increase the distance. Nevertheless, a retractable extension auxiliary device is limited in terms of shooting distance in comparison with a tripod.

A conventional tripod can stand at a distance for photo shooting. However, a conventional tripod is bulky when folded and unsuitable for portability and not easy to hold in hand, and, hence, is unsuitable for assisting in taking selfie.

However, as the desk space is a rare commodity in most working spaces, it is desirable to design an item that is able to serve multiple functions.

SUMMARY

A primary object of the present invention is to provide a multi-functional support assembly. The support assembly includes a plurality of leg elements able to be expanded or folded. In a folded state, the overall appearance of the support assembly is tubular and is easy to hold in hand. With an additional element, the support assembly can be used for assisting in taking selfie. When in expanded state, the plurality of the leg elements is stretched outwards to form legs for standing, similar to the legs in a tripod. As such, the support assembly is used for distance photo shooting.

To achieve the above object, the present invention includes a fixed base, a locking element, a support element and a plurality of leg elements, wherein the fixed base having a guiding hole with outer surface wall having at least three coupling walls and at least a rim, the rim protruding beyond the coupling walls along a radial direction; the support element being disposed through the guiding hole and able to move along the guiding hole linearly; the number of the plurality of leg elements being at least three, and the plurality of leg elements being distributed around the fixed base; each coupling wall having a coupling axis in the radial direction to couple with the leg element; the leg element having a shape with two side walls extending from the coupling, the side walls of two adjacent leg elements being closely aligned side-by-side to form a hollow tube when not expanded to; the leg elements able to rotate outwards around the coupling axis, and when expanded, the edges of the leg elements contacting the rim to restrict the movement of the leg element to form an acute angle with the support element.

The feature of the present invention lies in that each leg element is coupled to the coupling axes distributed on circumference of the fixed base along the radial direction. Therefore, when expanded, the leg elements are rotated outward along a tangent direction, unlike the conventional manner of flipping outwardly along the radial direction. When folded, the leg elements are arranged to form a hollow tube with side walls of adjacent leg elements aligned side-by-side for easy holding.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
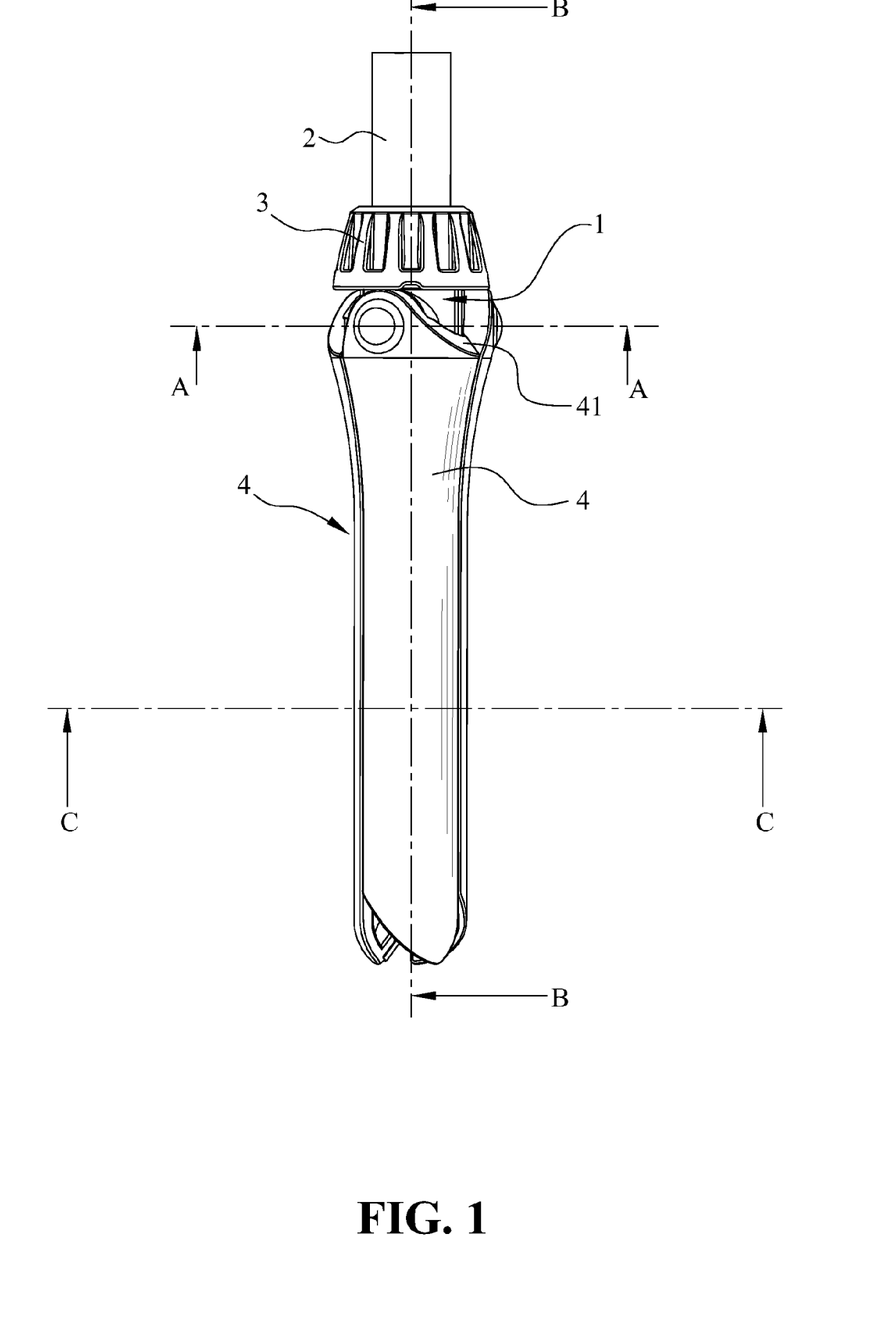
FIG. 1 shows a schematic view of the present invention in a folded state.
Figure 2:
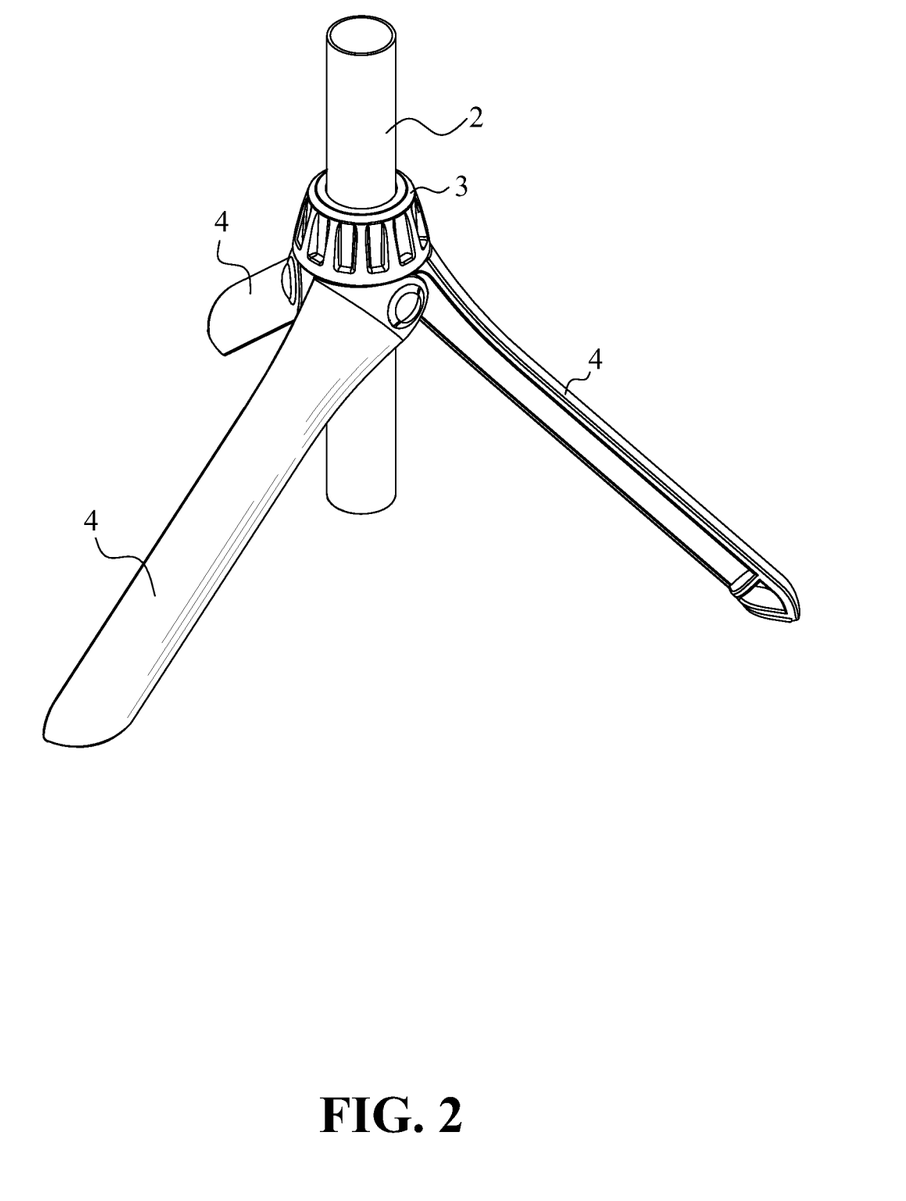
FIG. 2 shows a schematic view of the present invention in an expanded state.

FIG. 1 shows a schematic view of the present invention in a folded state; and FIG. 2 shows a schematic view of the present invention in an expanded state. A multi-functional support assembly of the present invention includes a fixed base 1, a support element 2, locking element 3 and a plurality of leg elements 4. The support element 2 penetrates through the fixed base 1 and can slide linearly inside the fixed base 1 for position adjustment. The locking element 3 is disposed at the fixed base 1. In a locked state, the locking element 3 can fasten the position of the support element 2 with respect to the fixed base 1. The plurality of leg elements 4 are coupled to the circumference of the fixed base 1, with each leg element 4 having a side wall on both sides. In the folded state, the side walls of two adjacent leg elements 4 are aligned side-by-side closely so that the plurality of leg elements 4 forms a hollow tube easy for hand holding. In the expanded state, the plurality of leg elements 4 is rotated outwards around the coupling to form the legs of the support assembly in a standing position, similar to the legs in a tripod.

Figure 3:
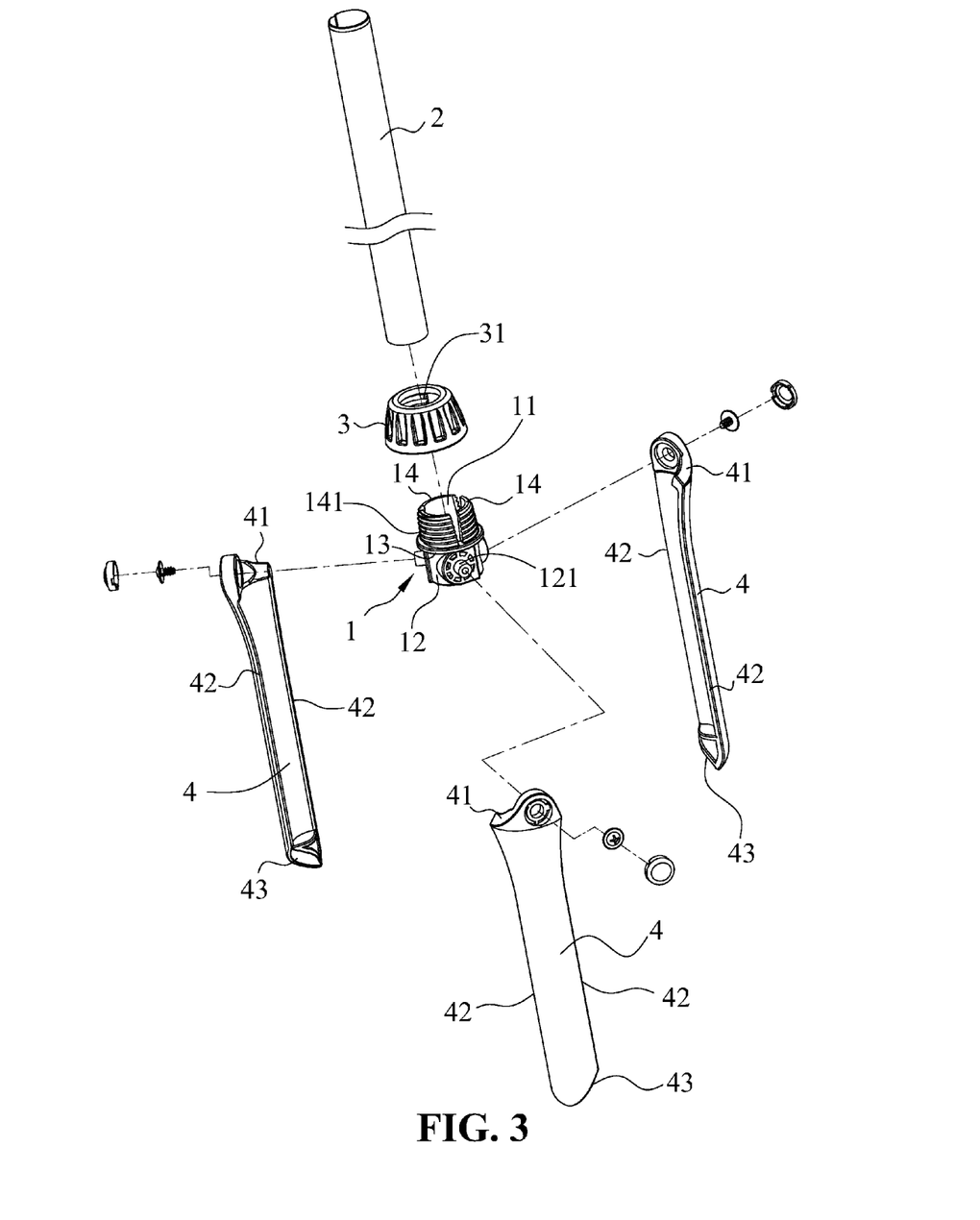
FIG. 3 shows a dissected view of the present invention.
Figure 4:
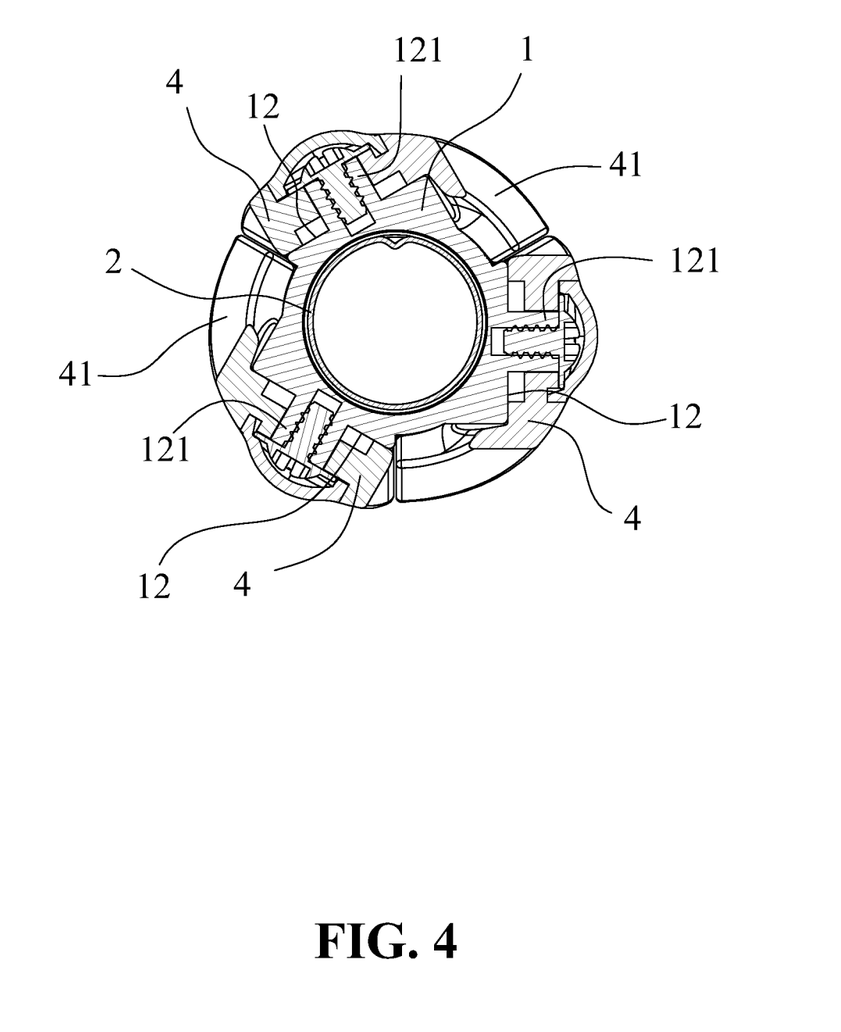
FIG. 4 shows an enlarged cross-sectional view of the present invention along AA direction in FIG. 1.
Figure 5:
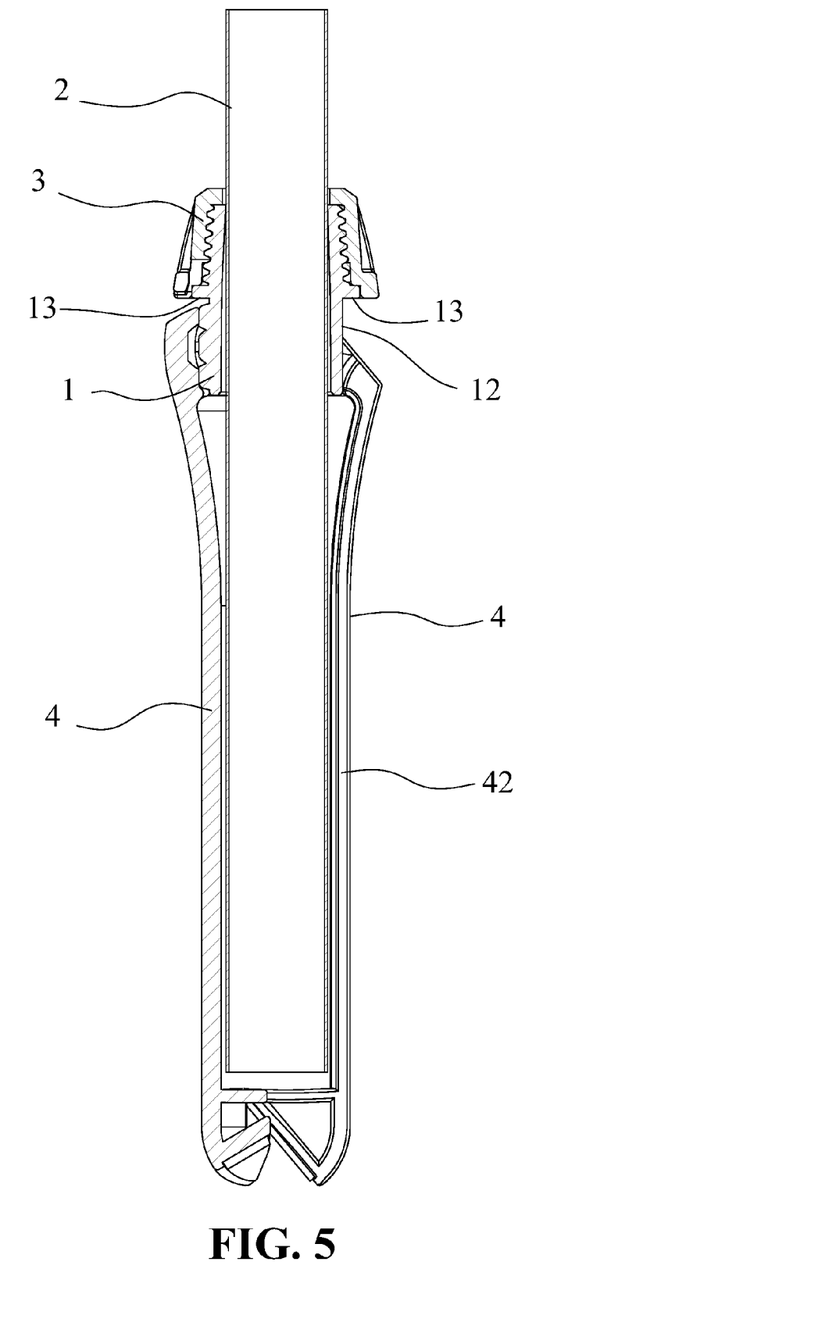
FIG. 5 shows an enlarged cross-sectional view of the present invention along BB direction in FIG. 1.

The following describes the details of the components. FIG. 3 shows a dissected view of the present invention. The fixed base 1 is a hollow tube, with a guiding hole 11 through the center along an axial direction. The guiding hole 11 allows the support element 2 to penetrate through and move linearly for position adjustment. The circumference wall of the fixed base 1 includes at least three coupling walls 12 (as shown in FIG. 4) and at least a rim 13. The coupling walls 12 are distributed evenly around the circumference of the fixed base 1. The wall surface of the coupling wall 12 is along the axial direction while a coupling axis 121 is disposed in a protruding manner along the radial direction. As shown in FIG. 5, the rim 13 is adjacent to the coupling wall 12, and protrudes above the coupling wall 12 along the radial direction. In the present embodiment, the rim 13 is a protruding ring, formed at the center section on the outer wall of the fixed base 1. The rim 13 is to restrict the opening angle of the leg element 4. The support element 2 is a hollow tube in the embodiment, but other shapes can also be used. In actual application, the support element 2 may be disposed with a plurality of concentric tubes with gradually reduced diameters to form a retractable rod. The application will be described later.

Figure 6:
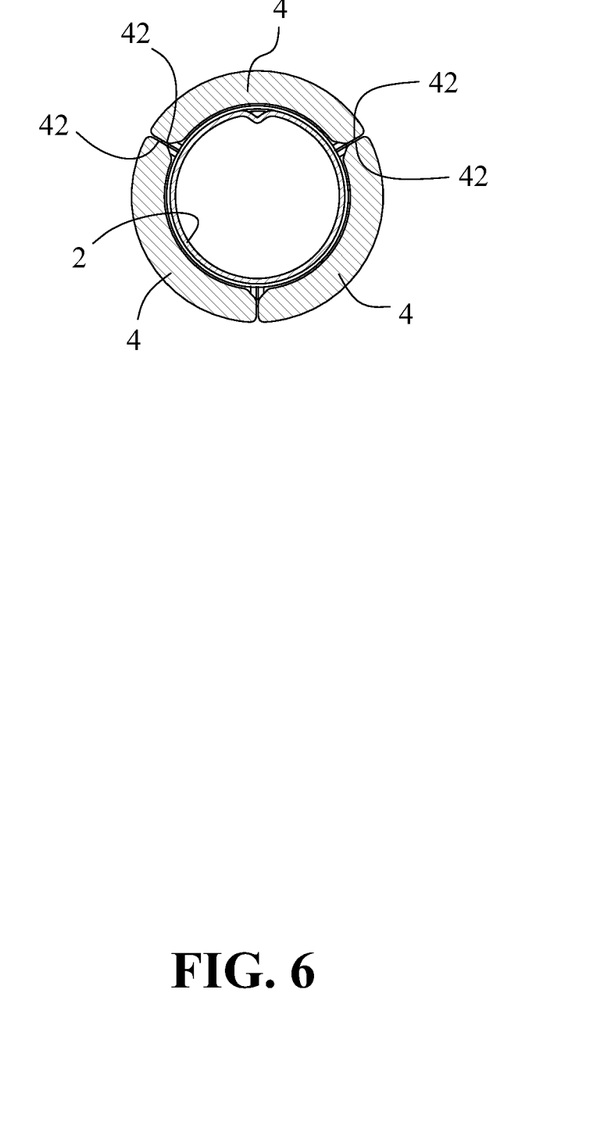
FIG. 6 shows an enlarged cross-sectional view of the present invention along CC direction in FIG. 1.

The number of the plurality of leg elements 4 is at least 3. After assembly, the plurality of the leg elements 4 is distributed evenly around the fixed base 1, with each leg element 4 coupled to the coupling axis 121 of the coupling wall 12. The shape of the leg element is an arc-shaped shell, extending downwards from the coupling. A stop wall 41 is disposed at the edge of the leg element 4 at the coupling, two side walls are disposed on two sides to form the arc-shaped shell, and a contact bottom 43 is disposed at the bottom. As shown in FIG. 6, when in the folded state, the two adjacent leg elements 4 are aligned side-by-side closely to form a hollow tube easy for hand holding. In addition, the leg element 4 rotates outwardly along the coupling axis 121. After rotation, the stop wall 41 will contact the rim 13 and the rim 13 will restrict the leg element 4 to rotate further. The angle between the leg element 4 and the support element 2, as well as the rotation angle are acute. The contact bottom 43 is a slant surface with respect to the side wall 42 so that the contact bottom will be in a horizontal position for steady standing when the leg element 4 is rotated.

The locking element 3 is to fasten the relative position between the support element 2 and the fixed base 1. The locking element 3 may be realized by various structures. A simple design is to implement the locking element as a screw and the fixed base 1 is disposed with a screw hole along the radial direction. When the locking element 3 is tightly screwed into the screw hole, the tip of the locking element 3 contacts the outer wall of the support element 2 penetrating the fixed base 1 to achieve the fastening. In another embodiment, the fixed base 1 is disposed with a plurality of press plates 14 at the end opposite to the position of the coupling wall 12. The press plates 14 are distributed in a ring manner to form a partial outer wall of the fixed base 1. The press plates 14 are disposed with outer screw thread 141 on the outer surface. The locking element 3 includes an inner screw thread 31. When the locking element 3 tightens by rotation on the outside of the press plates 14, the inner wall of the press plates 14 comes into contact with the outer wall of the support element 2 to achieve fastening.

Figure 7:
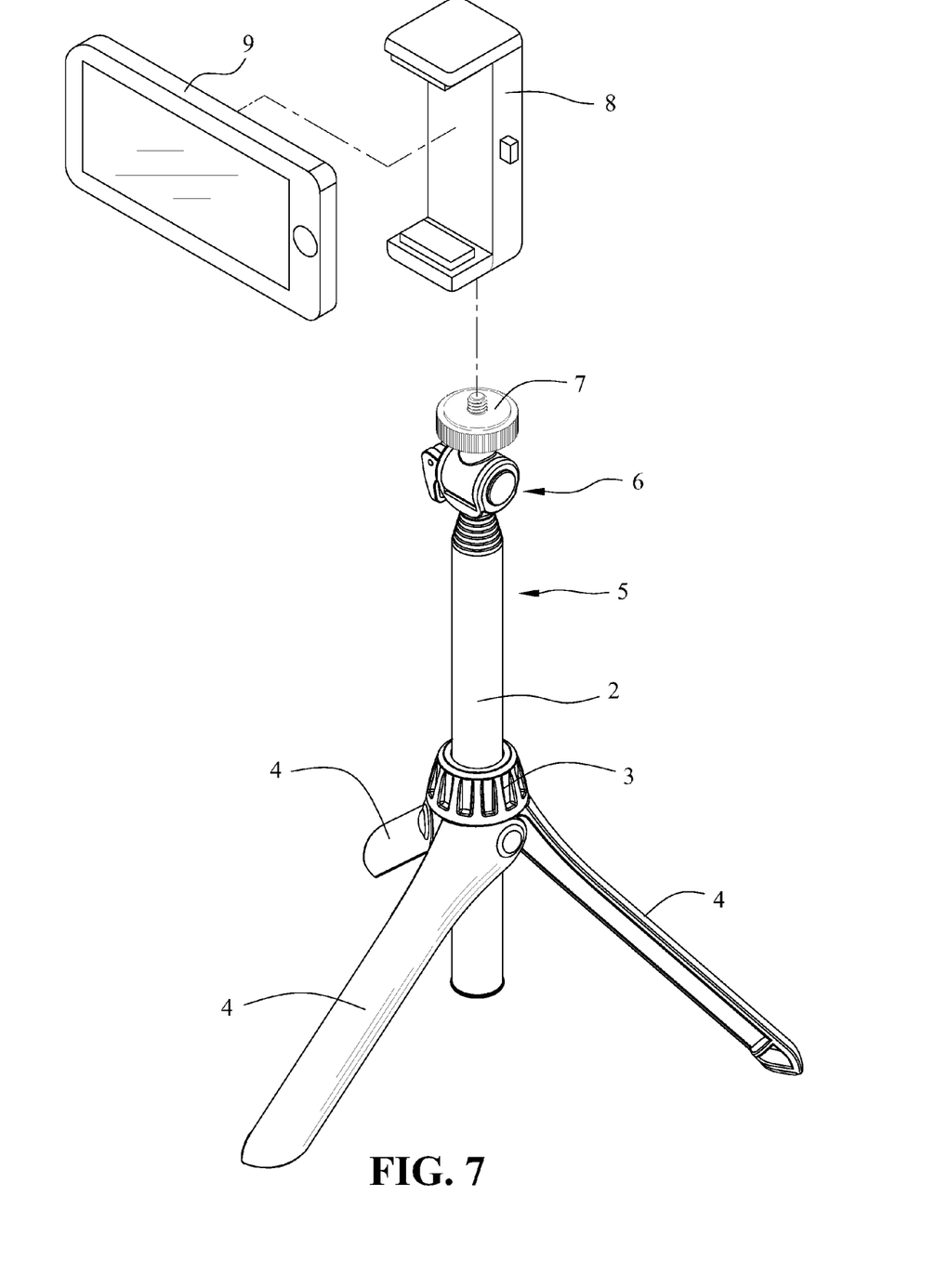
FIG. 7 shows a schematic view of the present invention in actual application.

The support assembly is a basic structure for various products. When applied, additional components is added to form a complete product. FIG. 7 shows a schematic view of the present invention in actual application. The support assembly also includes a fixed base 1, a support element 2, a locking element 3 and a plurality of leg elements 4. Furthermore, the support element 2 further includes a plurality of concentric tubes sheathed together to form a retractable rod 5. The concentric tube with the smallest diameter of the retractable rod 5 is disposed with an angle-adjustment base 6 at the top. The angle-adjustment base 6 is coupled to a connection platform 7 to provide fastening to a clamping assembly 8. As such, the clamping assembly 8 can clamp onto an object 9, such as, a smart phone or a camera.

Figure 8:
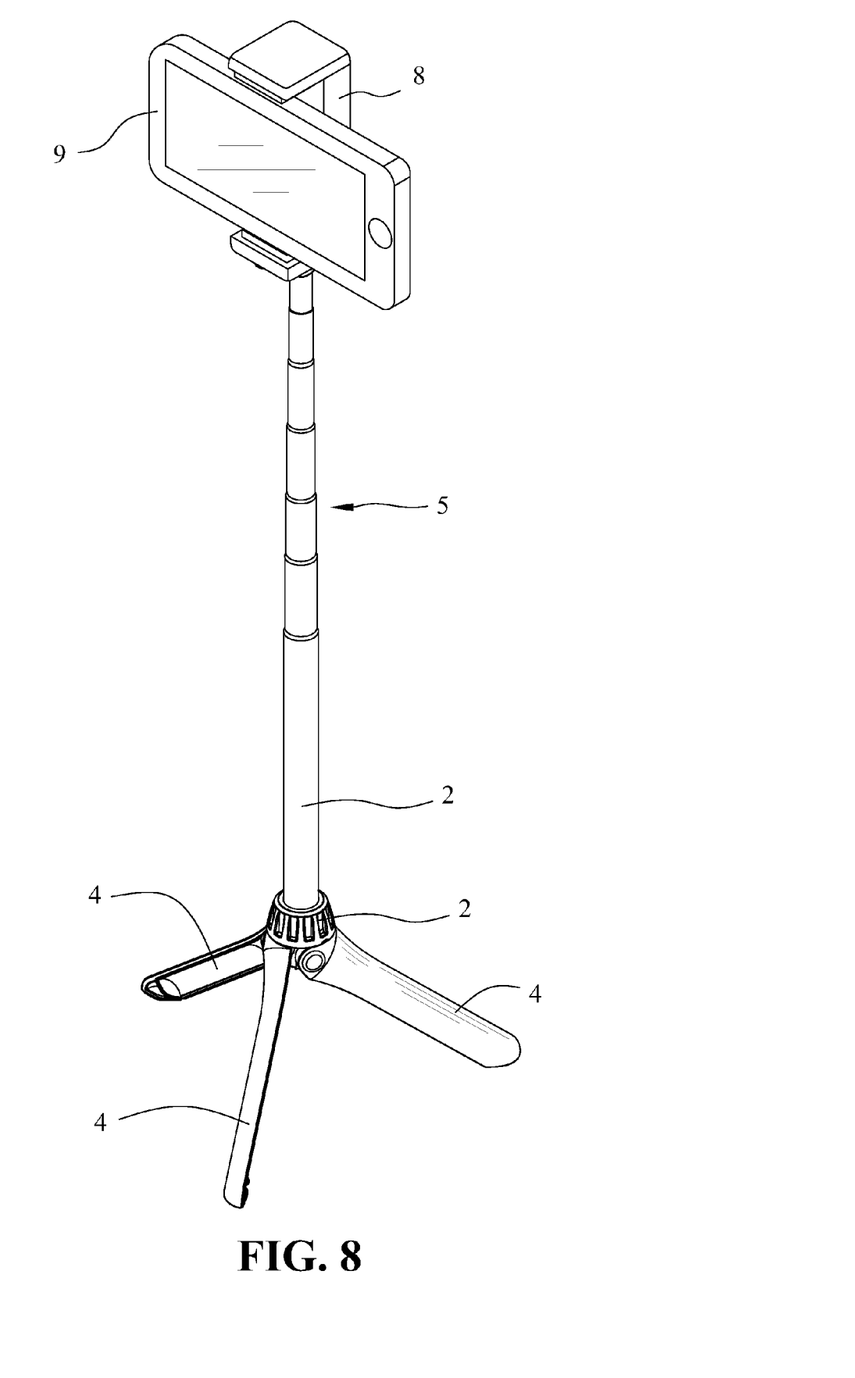
FIG. 8 shows a schematic view of the present invention in a first application scenario.

FIG. 8 shows a schematic view of the present invention in a first application scenario. In this application scenario, the plurality of the leg elements 4 is rotated outwardly to form a tripod to stand, and the retractable rod 5 is extended to a suitable length and locked by the locking element 3 to the fixed base 1. The clamping assembly 8 clamps onto an object 9 (a smart phone or a camera). The angle-adjustment base 6 is adjusted for angle and directions so that a distant photo shooting can be conducted.

Figure 9:
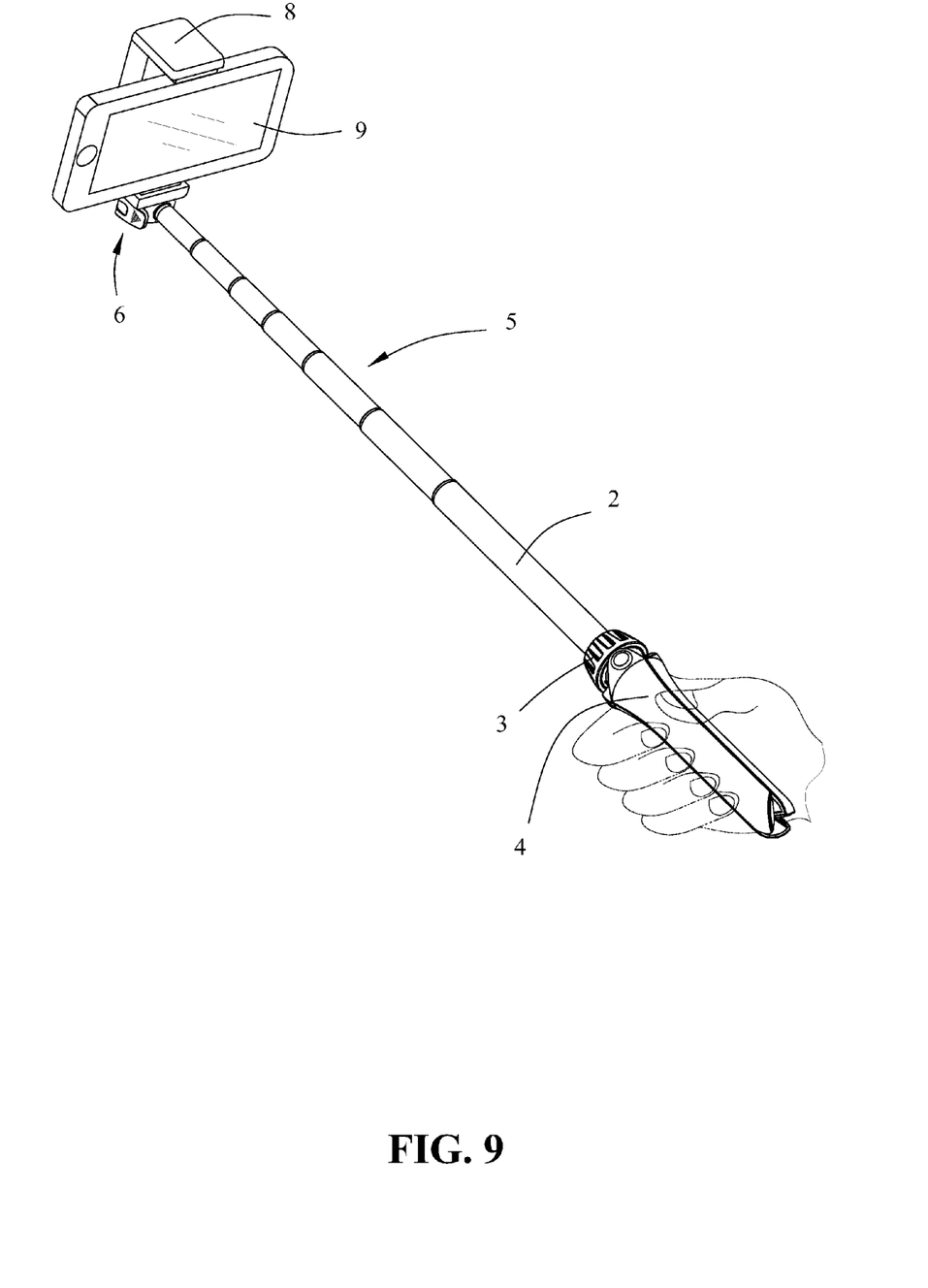
FIG. 9 shows a schematic view of the present invention in a second application scenario.

FIG. 9 shows a schematic view of the present invention in a second application scenario. In this application scenario, the support assembly can assist in taking selfie. The plurality of leg elements 4 is folded to form a hollow tube for holding. The retractable rod 5 is extended to a suitable length and locked by the locking element 3 to the fixed base 1. The clamping assembly 8 clamps onto an object 9 (a smart phone or a camera). The angle-adjustment base 6 is adjusted for angle and directions so that a selfie can be taken.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A multi-function support assembly, comprising: a fixed base, a locking element, a support element and a plurality of leg elements;
   - wherein the fixed base having a guiding hole with outer surface wall having at least three coupling walls and at least a rim, rim protruding beyond the coupling walls along a radial direction;
   - the support element being disposed through the guiding hole and able to move along the guiding hole linearly;
   - the number of the plurality of leg elements being at least three, and the plurality of leg elements being distributed around the fixed base; each coupling wall having a coupling axis in the radial direction to couple with the leg element; the leg element having a shape with two side walls extending from the coupling, the side walls of two adjacent leg elements being closely aligned side-by-side to form a hollow tube when not expanded to; the leg elements able to rotate outwards around the coupling axis, and when expanded, the edges of the leg elements contacting the rim to restrict the movement of the leg element to form an acute angle with support element, wherein the locking element fasten the position of the support element with respect to the fixed base.

2. The multi-function support assembly as claimed in claim 1, wherein, the hollow tube formed by the plurality of leg elements can accommodate the support element.

3. The multi-function support assembly as claimed in claim 1, wherein each leg element includes a contact bottom, the contact bottom is a slant surface disposed at the bottom of the leg element, and when the leg element is rotated to expand, the contact bottom is in a horizontal position to provide contact to a surface to stand.

4. The multi-function support assembly as claimed in claim 1, wherein a stop wall is disposed at the edge of leg element at the coupling, and when the leg element is rotated to expand, the stop wall comes into contact with the rim to restrict the leg element to rotate further outwardly, and the rotation angle stays acute.

5. The multi-function support assembly as claimed in claim 1, wherein the fixed base is disposed with a plurality of press plates at the end opposite to the position of the coupling wall; the press plates are distributed in a ring manner to form a partial outer wall of the fixed base; the press plates are disposed with outer screw thread on the outer surface; the locking element comprises an inner screw thread; when the locking element tightens by rotation on the outside of the press plates, the inner wall of the press plates comes into contact with the outer wall of the support element to achieve fastening.

6. The multi-function support assembly as claimed in claim 1, wherein the locking element is a screw and the fixed base is disposed with a screw hole along the radial direction; when the locking element is tightly screwed into the screw hole, the tip of the locking element contacts the outer wall of the support element penetrating the fixed base to achieve the fastening.

7. The multi-function support assembly as claimed in claim 1, wherein the support element is a retractable rod.

* * * * *